(12) United States Patent  
Rabell

(10) Patent No.: US 7,059,225 B1  
(45) Date of Patent: Jun. 13, 2006

(54) HOLDER DEVICE FOR ATTACHING A CIRCULAR SAW TO A T SQUARE

(76) Inventor: Roberto Jaime Rabell, 1400 NE. Pine Island Rd., Cape Coral, FL (US) 33909

( * ) Notice: Subject to any disclaimer, the term of this patent is extended or adjusted under 35 U.S.C. 154(b) by 0 days.

(21) Appl. No.: 11/041,646

(22) Filed: Jan. 24, 2005

Related U.S. Application Data

(63) Continuation of application No. 10/199,252, filed on Jul. 22, 2002.

(51) Int. Cl.
*B27B 11/00* (2006.01)

(52) U.S. Cl. .............................................. 83/13; 83/743

(58) Field of Classification Search ................. 83/574, 83/745, 743, 13; 33/427, 428
See application file for complete search history.

(56) References Cited

U.S. PATENT DOCUMENTS

| | | | | |
|---|---|---|---|---|
| 3,503,131 A * | 3/1970 | Warner | ......................... | 33/810 |
| 4,098,160 A * | 7/1978 | Weil | ............................ | 83/468 |
| 4,380,872 A * | 4/1983 | Moran | ........................ | 33/529 |
| 4,574,492 A * | 3/1986 | Miller | ......................... | 33/427 |
| 4,641,435 A * | 2/1987 | Brown | ........................ | 33/427 |
| 5,062,213 A * | 11/1991 | Kolesky | ....................... | 33/479 |
| 5,131,164 A * | 7/1992 | Miller | ......................... | 33/613 |
| 5,182,975 A * | 2/1993 | Warner | ........................ | 83/745 |
| 5,243,891 A * | 9/1993 | Smith, Jr. | .................... | 83/487 |
| 5,333,385 A * | 8/1994 | Chou | .......................... | 30/371 |
| 5,427,006 A * | 6/1995 | Finley | ......................... | 83/574 |
| 5,651,298 A * | 7/1997 | Break et al. | ............... | 83/471.3 |
| 5,778,547 A * | 7/1998 | Wolken | ....................... | 33/427 |
| 5,921,161 A * | 7/1999 | Newell | ......................... | 83/574 |
| 6,068,036 A * | 5/2000 | Cassidy | .................... | 144/134.1 |
| 6,079,309 A * | 6/2000 | Molburg | ..................... | 83/745 |
| 6,119,354 A * | 9/2000 | Hansen | ..................... | 33/27.03 |
| 6,604,296 B1 * | 8/2003 | Mastrobattista | ............. | 33/640 |

\* cited by examiner

*Primary Examiner*—Charles Goodman
(74) *Attorney, Agent, or Firm*—William E. Noonan

(57) ABSTRACT

A holder device attaches a circular saw to a T square. The device includes a body having opposite left-hand and right-hand ends and opposite forward and rearward sides that extend between the ends. A passageway formed through the body interconnects the left-hand and right-hand ends for movably receiving the longitudinal arm of the T square. A receptacle formed in one of the sides receives the base plate of the saw to interengage the body with the saw. The lateral arm of the T square is abuttably positionable against and movable against an edge of a work piece for guiding the circular saw to make a selected cut in the work piece.

16 Claims, 2 Drawing Sheets

HOLDER DEVICE FOR ATTACHING A CIRCULAR SAW TO A T SQUARE

RELATED APPLICATION

This application is a continuation in part of U.S. patent application Ser. No. 10/199,252 filed Jul. 22, 2002.

FIELD OF THE INVENTION

This invention relates to a holder device for attaching a circular saw to a carpenter's T square such that the T square is capable of conveniently guiding the saw to make a precise cut in drywall, plywood or other material.

BACKGROUND OF THE INVENTION

A circular saw is commonly used to perform "rip" cutting operations in various materials including drywall, plywood, wood paneling, etc. Using the circular saw in this manner often presents a number of difficulties. In order to form a precise rip cut with straight and accurate edges, the work piece first must be properly measured and marked. This can be a time consuming and tedious procedure. Oftentimes, the work piece is not marked accurately and, as a result, is mis-cut. Material and time are wasted. Even if the work piece is marked correctly, maintaining a straight cut while moving the saw can be difficult.

Rip guides have been developed to assist the cutting operation. However, these devices tend to be relatively large and unwieldy. Typically, straight edges must be assembled and clamped to each end of the work piece to be ripped. Conventional rip saw guides are inconvenient to set-up and tend to limit the rip capacity of the saw.

Newell, U.S. Pat. No. 5,921,161, discloses a conversion device that supports a circular saw above a work table. The conversion device is mounted to the table and the saw is supported on the device. A piece of lumber or other work piece is then slid beneath the conversion device and cut by the saw. This guide is not designed to be conveniently portable and instead is secured to the table. In addition, at least two workers are required to perform the cutting operation. One must manipulate the work piece while the other operates the saw.

SUMMARY OF THE INVENTION

It is therefore an object of the present invention to provide a compact and easy to use holder device that enables a circular saw to be quickly and conveniently attached to a T square, which can then be used by a single person to guide the saw to make a precise rip cut in a selected work piece.

The design of the present device arises out of the need for a compact and simple to use device that will assist a person using a circular saw in the performance of rip cutting operations. The device of the present invention, unlike other rip guides does not limit the rip capacity of the saw and does not require that straight edges be assembled and clamped to each end of the work piece. The present invention also eliminates the need to measure and mark both ends of the work piece before it is cut.

This invention features a holder device that attaches a circular saw to a T square for guiding the saw to make a selected cut in a work piece. The saw has a base plate and the T square has a longitudinal arm and a lateral arm attached perpendicularly thereto. The holder device includes a body having opposite left-hand and right-hand ends and opposite forward and rearward sides that extend between the ends. A passageway is formed through the body and interconnecting the left-hand and right-hand ends for movably receiving the longitudinal arm of the T square. A receptacle is formed in at least one of the forward and rearward sides for receiving the base plate of the saw to interengage the body with the saw. The lateral arm of the T square is abuttably positionable against and movable along an edge of the work piece to position the circular saw for making a selected cut in the work piece. The holder device holds the saw steady, in a straight-line cutting position while the T square guides the saw along the work piece to perform rip cuts on plywood, drywall or other sheet-like materials.

In a preferred embodiment, the device includes a releasable fastener for locking the body at a selected position on the longitudinal arm of the T square. The fastener may include a threaded connector that is engaged with a complementary threaded opening in the body, which opening communicates with the passageway. The threaded body is tightened in the opening to engage the longitudinal arm and fasten the body at the selected position thereon.

A stop may be received by and secured within the receptacle to adjust the size of the receptacle such that the base plate of the saw is snugly retained within the receptacle. The stop may be positionally adjustable within the receptacle to adjust the size of the receptacle for accommodating a corresponding saw base plate. The stop may be selectively movable toward the right-hand and left-hand ends of the body. A releasable locking component may be provided for securing the base plate within the receptacle. The locking component may include a set screw threadably interengaged with a complementary set screw opening in the body. The opening may be in communication with the receptacle and the set screw may be tightened within the set screw opening to engage the stop and retain the base plate of the circular saw within the receptacle.

DETAILED DESCRIPTION OF PREFERRED EMBODIMENTS

Other objects, features and advantages will occur from the following description of a preferred embodiment and the accompanying drawings, in which.

Figure 1:
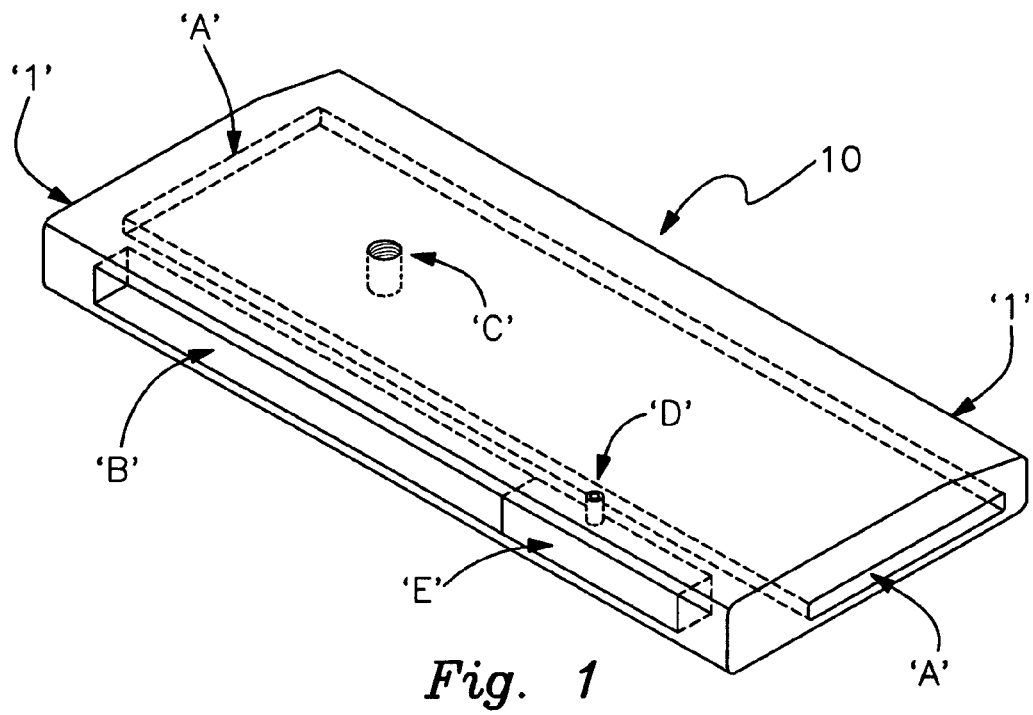
FIG. 1 is an isometric view of a preferred version of the holder device of this invention.
Figure 2:
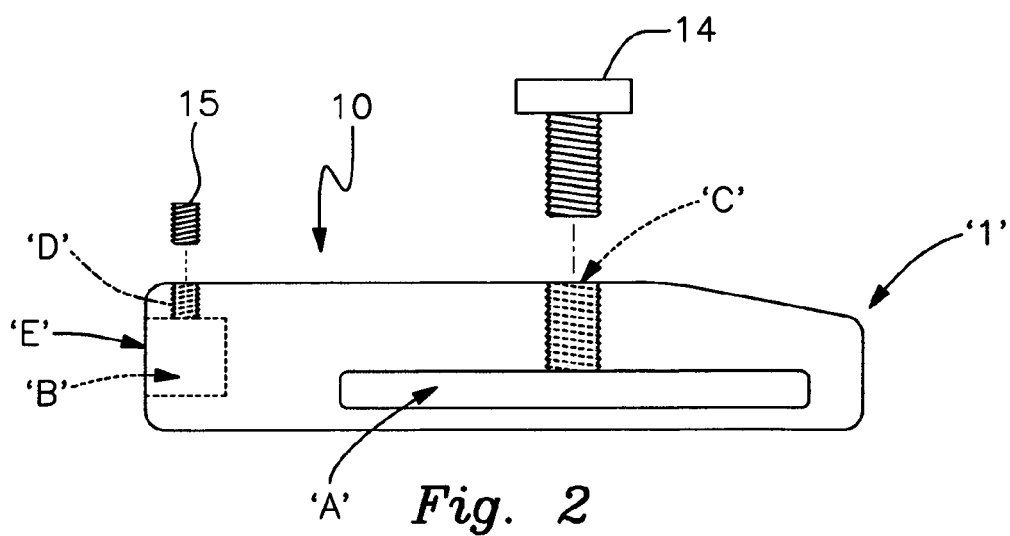
FIG. 2 is a side view of the preferred holder device.

There is shown in FIGS. 1 and 2 a holder device 10 for attaching a circular saw to a carpenter's T square 11 in accordance with this invention. The device comprises a body 1 that is preferably composed of a molded plastic or other durable material such as metal. An elongate passageway A extends from a left-hand end of body 1 to a right-hand end of the body. Passageway A slidably receives the longitudinal arm 3 of T square 11 in the manner shown in FIG. 3. The longitudinal arm 3 is slidable through passageway A as indicated by doubleheaded arrows 5. This allows the holder to be adjusted to a selected position along longitudinal arm 3.

Figure 3:
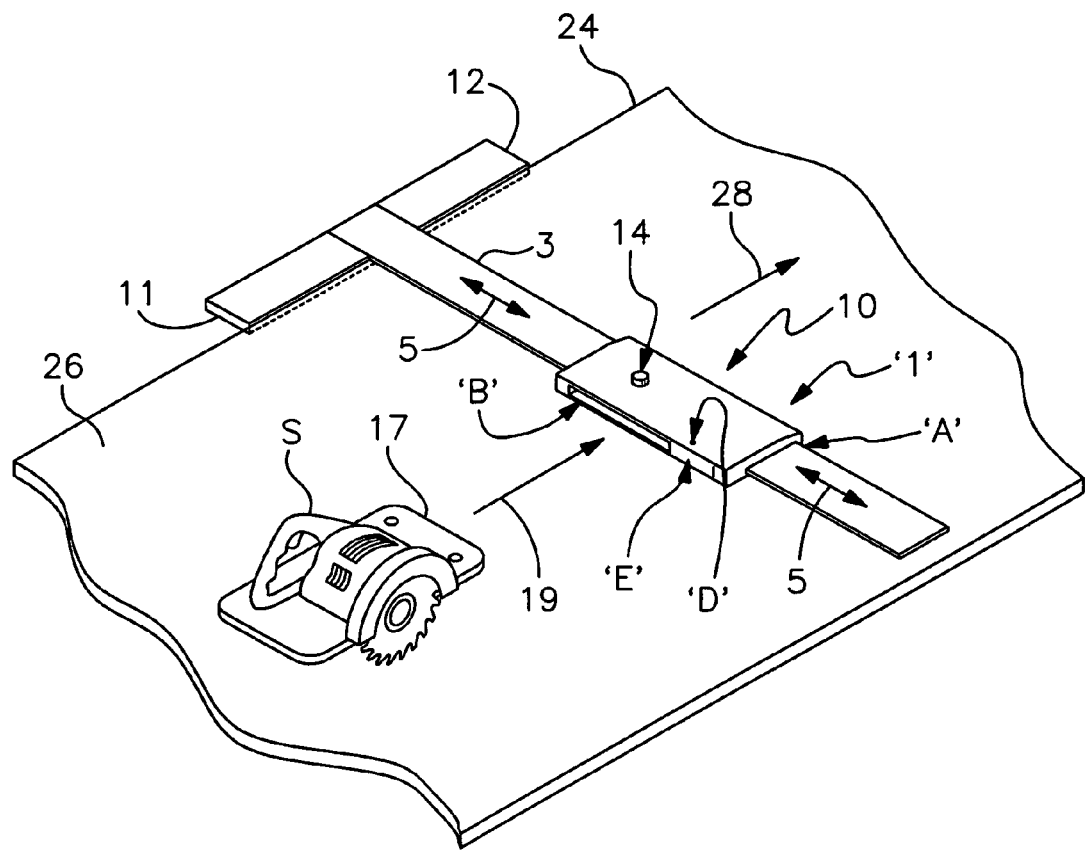
FIG. 3 is an isometric view of the holder device as mounted on a T square and positioned to receive a circular cutting saw.

A threaded thumbscrew hole C is formed through the upper surface of body 1. Hole C communicates with passageway A as shown in FIGS. 1 and 2. The thumbscrew threaded hole C is interengaged by a thumbscrew 14 as shown in FIG. 3. The thumbscrew is tightened sufficiently within hole C to lockably engage T square 11. This locks the holder in a selected position along longitudinal arm 3 of the T square 11.

Body 1 further includes elongate forward and rearward sides that interconnect the left-hand and right-hand ends. An elongate receptacle B is formed in the rearward side of body 1. Receptacle B may have a length of approximately 7" such that it is capable of snugly receiving the 7" base plate of a standard circular saw.

In FIGS. 1–3, receptacle B is shown further accommodating a removable saw stop E. This is typically a plastic or metal element that is selectively received within receptacle B so that the length of the receptacle may be adjusted. For example, stop E may have a length of approximately 2" so that, with the stop inserted, the receptacle B has an opening that is effectively about 5" long. This allows the holder to accommodate the 5" base plate of a smaller standard saw. Stop E is fixed in place by a set screw 15, FIG. 2, that is threadably interengaged with a corresponding hole D formed through body 1 and in communication with receptacle B.

It should be noted that the effective length of receptacle B may be adjusted in several other ways. In particular, set screw 15, FIG. 2, may be loosened and stop E adjusted within the receptacle to further decrease the length of the receptacle for even smaller base plates. In still other embodiments, the receptacle may extend fully from the left-hand end to the right-hand end of body 1. In such cases, the stop may be moved in either a left-hand or right-hand direction, as required, to respectively decrease or increase the size of receptacle B. This allows for all different sizes of circular saw base plates to be received within the receptacle B of the holder. As a result, various sizes of saws may be connected to device 10.

After holder 10 is locked into position on the longitudinal arm 3 of T square 11, the front edge of any standard circular saw base plate 17 can be inserted into receptacle B. If required, stop E is then introduced into the receptacle and adjusted as required and locked to retain the base plate snugly within the receptacle.

In operation, a sheet of plywood, drywall or other flat work piece is placed horizontally on sawhorses or a work table. A standard piece of plywood, for example, has a width of 4'. The desired cutting measurement or cut line is marked on the respective ends of the sheet.

Next, holder 10 is attached to the T square 11 and saw S. Specifically, longitudinal arm 3 of T square 11 is slid through passageway A as shown in FIG. 3. The bottom surface of holder 10 and the bottom surface of T square 11 are laid generally flat upon the marked end of the work piece. The front lip of the base plate of saw S is then inserted into receptacle B as depicted by arrow 19 in FIG. 3. If necessary, the stop E is installed, adjusted and locked as previously described so that base plate 17 is snugly retained within the receptacle. The saw is then adjusted laterally left or right, as needed, along arm 3. Holder 10 slides along longitudinal arm 3 of T square 11 until the saw blade is located over the cutting mark formed on the work piece. The user then tightens thumbscrew 14. This locks the holder and the attached saw laterally in position relative to the work piece. The holder and saw are prevented from moving further along arm 3. The worker then uses his free hand to maintain the lateral edge guide 12 of T square 11 firmly against the edge 24 of the work piece 26 to be ripped. The user pushes the saw forwardly as indicated by arrow 28. Lateral edge guide 12 is moved along the edge 24 of the work piece 26. The base plate 17 of the saw is held snugly in the receptacle so that the saw blade forms a precise, consistent and straight cut for the entire length of the work piece being ripped. A single worker quickly performs the cut. Time, material and manpower are saved.

The present invention establishes certain advantages and prompts speed and productivity in repetitive cutting operations by omitting the need to use a straight edge and clamps to mark the work piece in sheet material rip-cut operations. The device also eliminates the need to measure and mark both ends of the material to be ripped. The user no longer needs to re-measure identical size cuts on additional material, as long as he does not move the position of the saw on the longitudinal arm of the T square. The saw is held automatically and consistently to cut accurately along the desired line. Because the device is attached to the T square, it leaves the saw unencumbered to perform other cutting operations when needed, without the need to remove or reattach a device to the saw. The saw is simply and quickly disengaged from the receptacle of the holder. It is much easier to disengage the saw from holder 10 than from conventional ripsaw guides.

Lateral adjustment of the device is easily achieved by simply loosening thumbscrew 14. Saw S remains mounted in receptacle B and the saw is moved laterally from left to right or vice versa so that the saw blade can be re-set and aligned with an appropriate cutting mark. The thumbscrew is then retightened and the next guided cutting operation is performed. In each case, as the saw is pushed forwardly, the lateral arm of the T square remains flushly engaged with edge 24 of work piece 26. This maintains a straight and effective rip-cutting operation. A single user can effectively perform repeated cuts in a quick and accurate manner. Multiple workers are not required to operate the saw and move the work piece.

It should be noted that in alternative embodiments, various other features may be employed. For example, the passageway or slot that receives the longitudinal arm of the T square may have different configurations. In particular, the passageway may be exposed either through the upper or lower surface of the body. In such cases, the passageway may comprise a pair of inwardly turned lips that frictionally engage or grip respective sides of the longitudinal arm of the T square. The holder may be slid along the longitudinal arm of the T square and the holder may be frictionally held at a selected position along the longitudinal arm. Preferably, however, a thumbscrew or other positive form of fastening is utilized so that the holder is effectively locked in place at a selected position along the longitudinal arm.

From the foregoing it may be seen that the apparatus of this invention provides for a holder device for attaching a circular saw to a carpenter's T square such that the T square is capable of conveniently and accurately guiding the saw to make a precise straight cut in drywall, paneling or other material. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims.

What is claimed is:

1. A method for guiding a circular saw having a base plate to make a selected cut in a work piece comprising:

providing a T Square component having a longitudinal arm and a lateral arm attached perpendicularly thereto;

providing a holder body having opposite left-hand and right-hand ends and opposite forward and rearward sides that extend between said ends; said body further having a passageway formed therethrough and interconnecting said left-hand and right-hand ends and a receptacle formed in at least one of said forward and rearward sides;

slidably interengaging the longitudinal arm of T square component with said passageway to mount said holder on said T square component;

inserting the base plate of said saw into said receptacle to interengage said saw with said holder body; and abuttably positioning said lateral arm of said T square against an edge of a work piece and moving said lateral arm along said edge of the work piece to guide the circular saw to make a selected cut in the work piece.

2. A device for making a selected guided cut in a work piece, said device comprising:

a circular saw having a base plate;

a T square component having a longitudinal arm and a lateral arm attached perpendicularly thereto;

a holder body having opposite left-hand and right-hand ends and opposite forward and rearward sides that extend between said ends;

a passageway formed through said body and interconnecting said left-hand and right-hand ends for movably receiving the longitudinal arm of said T square component; and a receptacle formed in at least one of said forward and rearward sides for receiving said base plate of said saw to interengage said body with said saw; whereby said lateral arm of said T square component is abuttably positionable against and movable along an edge of a work piece for guiding said circular saw to make the selected cut in the work piece.

3. The device of claim 2 further including a releasable fastener for locking said body at a selected position on the longitudinal arm of the T square.

4. The device of claim 3 in which said fastener includes a threaded connector that is engaged with a complementary threaded opening in said body, which opening communicates with said passageway, said threaded connector being tightened in said opening to engage the longitudinal arm and fasten said body at the selected position thereon.

5. The device of claim 2 in which a stop is received by and secured within said receptacle to adjust the size of said receptacle such that the base plate of the saw is snugly retained within said receptacle.

6. The device of claim 5 in which said stop is positionally adjustable within said receptacle to adjust the size of said receptacle for accommodating a corresponding base plate.

7. The device of claim 6 in which said stop is selectively movable toward the right-hand and left-hand ends of said body.

8. The device of claim 2 further including a releasable locking component for securing said stop within said receptacle.

9. The device of claim 8 in which said locking component includes a set screw threadably interengaged with a complementary set screw opening in said body, said opening in communication with said receptacle, said set screw being tightened with said set screw to engage said stop and retain the base of circular saw within the receptacle.

10. A device for making a guided rip cut in a sheet-like work piece, said device comprising:

a circular saw having a base plate;

a T square component having a longitudinal arm and a lateral arm attached perpendicularly thereto, said lateral arm having a guide edge for engaging a corresponding edge of the work piece;

a holder body having opposite left-hand and right-hand ends, opposite forward and rearward sides that extend between said ends, and opposite upper and lower surfaces that extend between said between ends and said sides, said lower surface being substantially planar;

a passageway formed through said body and interconnecting said left-hand and right-hand ends for movably receiving the longitudinal arm of said T square component; and a receptacle received in at least one in one of said forward and rearward sides of said body for receiving said base plate of said saw to interengage said holder body with said saw; said lateral arm of said T square component being abuttably positionable against and movable along an edge of the sheet-like work piece and said lower surface of said holder body being flushly interengagable with the work piece to guide said circular saw to make a rip cut in the work piece.

11. The device of claim 10 further including a releasable fastener for locking said body at a selected position on the longitudinal arm of the t-square.

12. The device of claim 11 in which said fastener includes a threaded connector that is engaged with a complementary threaded opening in said body, which opening communicates with said passageway, said threaded connector being tightened in said opening to engage the longitudinal arm and fasten said body at the selected position thereon.

13. The device of claim 10 in which a stop is received by and secured within said receptacle to adjust the size of said receptacle such that the base plate of the saw is snugly retained within said receptacle.

14. The device of claim 13 in which said stop is positionally adjustable within said receptacle to adjust the size of said receptacle for accommodating a corresponding saw base plate.

15. The device of claim 12 further including a releasable locking component for securing said stop within said receptacle.

16. The device of claim 15 in which said locking component includes a set screw threadably interengaged with a complementary set screw opening in said body, said opening in communication with said receptacle, said set screw being tightened with said set screw to engage said stop and retain the base of circular saw within the receptacle.

* * * * *